United States Patent
Bonavita et al.

(10) Patent No.: US 7,930,572 B2
(45) Date of Patent: Apr. 19, 2011

(54) METHOD AND APPARATUS FOR REDUCING MEMORY CURRENT LEAKAGE A MOBILE DEVICE

(75) Inventors: Frederic Bonavita, Tourrettes sur loup (FR); Pascal Guignon, Antibes (FR); Laurent Le-Faucheur, Cap d'Antibes (FR); Francois Babin, Villeneuve-Loubet (FR)

(73) Assignee: Texas Instruments Incorporated, Dallas, TX (US)

( * ) Notice: Subject to any disclaimer, the term of this patent is extended or adjusted under 35 U.S.C. 154(b) by 985 days.

(21) Appl. No.: 10/849,709

(22) Filed: May 19, 2004

(65) Prior Publication Data
US 2005/0144494 A1 Jun. 30, 2005

(30) Foreign Application Priority Data
Dec. 24, 2003 (EP) .................................... 03293337

(51) Int. Cl.
- *G06F 1/32* (2006.01)
- *G06F 1/26* (2006.01)
- *G06F 13/10* (2006.01)

(52) U.S. Cl. ........ 713/320; 713/300; 713/310; 713/321; 713/322; 713/323; 713/324; 713/330; 713/340

(58) Field of Classification Search .................. 713/300, 713/310, 320–324, 330, 340
See application file for complete search history.

(56) References Cited

U.S. PATENT DOCUMENTS

| | | | |
|---|---|---|---|
| 5,262,998 A * | 11/1993 | Mnich et al. | 365/222 |
| 6,128,747 A * | 10/2000 | Thoulon | 713/330 |
| 6,249,837 B1 | 6/2001 | Tsuchiya et al. | |
| 6,336,162 B1 * | 1/2002 | Ueda | 711/105 |
| 6,886,105 B2 * | 4/2005 | Kahn et al. | 713/323 |
| 6,944,435 B2 * | 9/2005 | Contopanagos et al. | 455/307 |
| 7,020,040 B2 * | 3/2006 | Lin | 365/229 |
| 7,093,036 B2 * | 8/2006 | Raghunath et al. | 710/48 |
| 2001/0003206 A1 * | 6/2001 | Pole et al. | 713/320 |
| 2002/0144166 A1 | 10/2002 | Chang et al. | |
| 2003/0163745 A1 | 8/2003 | Kardach | |

OTHER PUBLICATIONS

Texas Instruments, TMS320C54x DSP Functional Overview, Literature No. SPRU307A, from "focus.ti.com/lit/ug/spru307a/spru307a.pdf".*

* cited by examiner

*Primary Examiner* — Thomas Lee
*Assistant Examiner* — Fahmida Rahman
(74) *Attorney, Agent, or Firm* — Ronald O. Neerings; Wade James Brady, III; Frederick J. Telecky, Jr.

(57) ABSTRACT

A processing system includes a processor (20) having an idle mode node for generating an idle mode signal indicating whether the processor is in an idle mode and a memory (22) having a data retention node for receiving a data retention mode signal. The memory includes circuitry for placing the memory in a low power state responsive to the data retention mode signal. The idle mode signal drives the data retention node, such that the memory is placed in the low power state when the processor is in idle mode.

12 Claims, 2 Drawing Sheets

METHOD AND APPARATUS FOR REDUCING MEMORY CURRENT LEAKAGE A MOBILE DEVICE

CROSS REFERENCE TO RELATED APPLICATIONS

Not Applicable

STATEMENT OF FEDERALLY SPONSORED RESEARCH OR DEVELOPMENT

Not Applicable

BACKGROUND OF THE INVENTION

1. Technical Field

This invention relates in general to electronic circuits and, more particularly, to a method and apparatus for reducing memory leakage in an electronic circuit.

2. Description of the Related Art

Over the last ten years, the popularity of mobile devices, including wireless telephones and personal digital assistants, has grown dramatically. For many users of mobile devices, power consumption is an extremely important factor, because such devices operate with a relatively small battery. It is desirable to maximize the battery life in these systems, since it is inconvenient to recharge or replace the batteries after short intervals.

One method to reduce power consumption involves placing various components in a low power state during periods where they are not in use. In some cases, a processing device, such as a general purpose processor or digital signal processor (DSP) can be placed in a low power state or completely powered down after storing its internal data to a non-volatile memory or a powered memory. High-speed random access memory (RAM), however, can not be turned off completely and still retain its data; in order to reduce power and retain data, it may be placed in a "data retention mode". In data retention mode, data in the memory remains intact, but the RAM cannot be accessed. In a typical data retention mode, the supply voltage, $V_{CC}$, to the memory is reduced to decrease current leakage.

Many processing devices, such as DSPs, have an internal RAM. When updating a DSP architecture to take advantage of an internal RAM memory with a data retention mode, several approaches have been developed to determine time periods in which to place a memory in data retention mode, based on the operation of an associated processing core. Existing solutions are limited to optimization of the power consumption through complex external hardware or through complicated software. Such solutions add greatly to the cost of development and complicate the final design of a DSP.

Therefore, a need has arisen for a simplified method and apparatus for reducing current leakage in a memory using data retention mode.

BRIEF SUMMARY OF THE INVENTION

In the present invention, a processing system includes a processor (20) having an idle mode node for generating an idle mode signal indicating whether the processor is in an idle mode and a memory (22) having a data retention node for receiving a data retention mode signal. The memory includes circuitry for placing the memory in a low power state responsive to the data retention mode signal. The idle mode signal drives the data retention node, such that the memory is placed in the low power state when the processor is in idle mode.

The present invention provides significant advantages over the prior art. First, the power retention mode can be supported without any code modification in the processor. Particularly in the mobile phone technology, support for legacy software is critical, since the software tuning effort is greater than adding gates in an ASIC. Second, the power savings attributable to the retention mode of the memory are optimized; the memory is place in power retention mode whenever the processor is placed in idle mode.

In a second embodiment of the invention, the memory can be placed in data retention mode responsive to which of several idle modes is selected. Consequently, the wake-up latencies of the memory are tunable.

BRIEF DESCRIPTION OF THE SEVERAL VIEWS OF THE DRAWINGS

For a more complete understanding of the present invention, and the advantages thereof, reference is now made to the following descriptions taken in conjunction with the accompanying drawings, in which:

FIG. 1b illustrates a timing diagram showing the initiation of the data retention mode in the prior art circuit of FIG. 1a;

FIG. 2b illustrates a timing diagram showing the initiation of the data retention mode in the prior art circuit of FIG. 2a;

FIG. 3 illustrates a block diagram of a mobile phone using the processing system of FIG. 2a.

DETAILED DESCRIPTION OF THE INVENTION

Figure 2A:
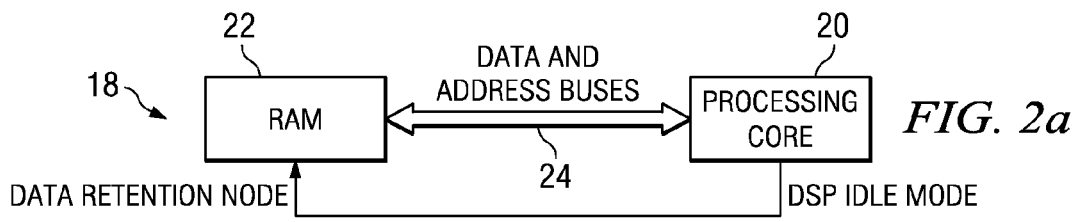
FIG. 2a illustrates a block diagram of a processing system using a processor and memory with enhance power consumption reduction.
Figure 2B:
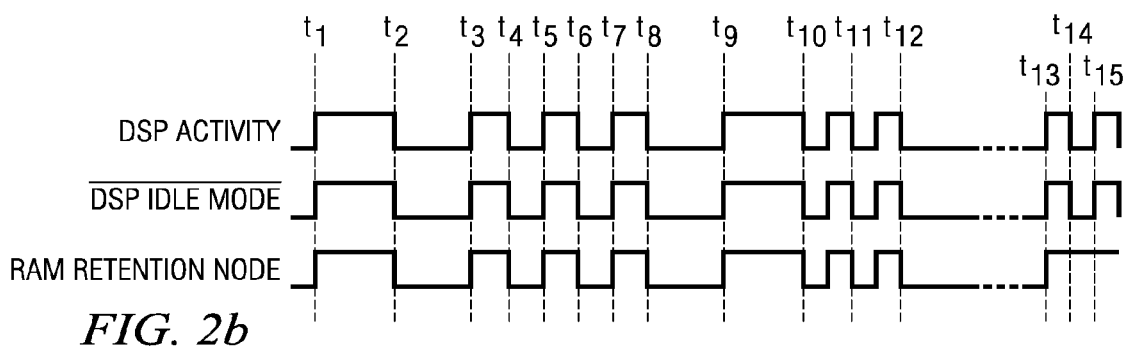
Figure 2C:
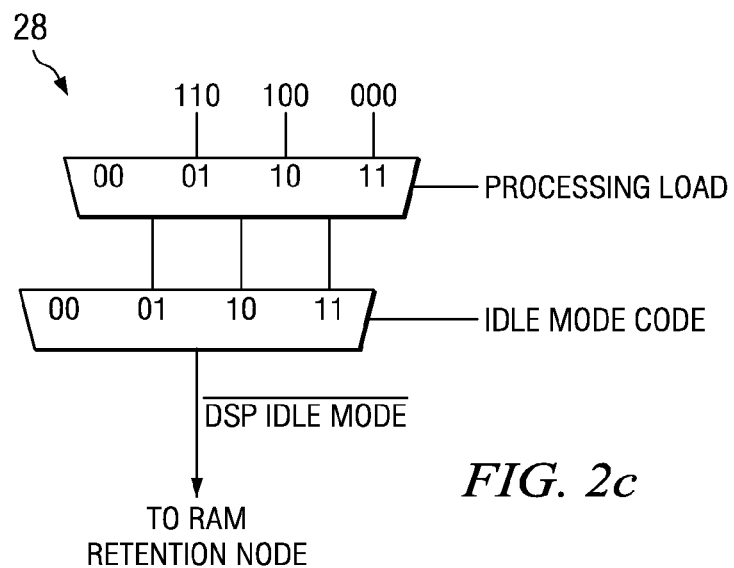
FIG. 2c illustrates a decoder for a multiple bit idle mode code.
Figure 3:
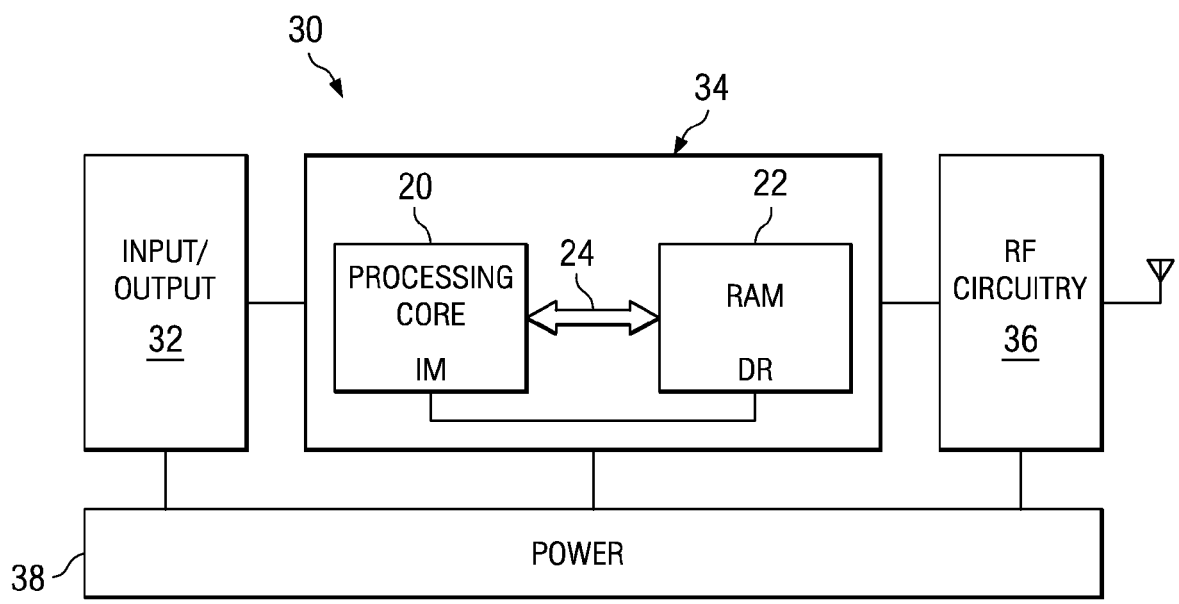

The present invention is best understood in relation to FIGS. 1-3 of the drawings, like numerals being used for like elements of the various drawings.

Figure 1A:
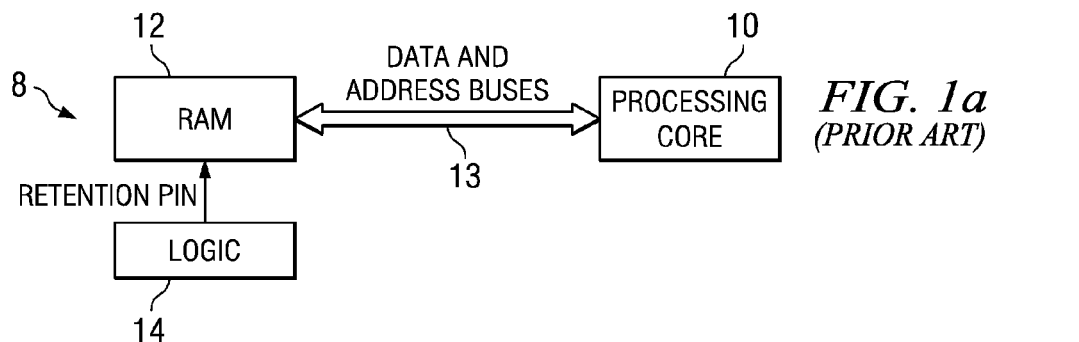
FIG. 1a illustrates a block diagram of a prior art processing system using a processor and memory to reduce power consumption through a RAM with a data retention mode.

FIG. 1a illustrates a simplified block diagram of prior art processing system 8 having a processing core 10 and associated internal memory 12. Logic 14 controls the data retention mode of the memory 12. The processing core 10 is coupled to the memory 12 in a normal fashion through data and address buses 13. Logic 14 monitors the activity of the processing core 10. When a long idle period is detected, logic 14 provides a signal to the retention node of the RAM 12 that causes the RAM 12 to enter a low voltage state, in which the contents of the memory is retained. In this low voltage state, data cannot be written to nor read from the RAM 12. Logic 14 can be implemented using software or hardware.

Figure 1B:
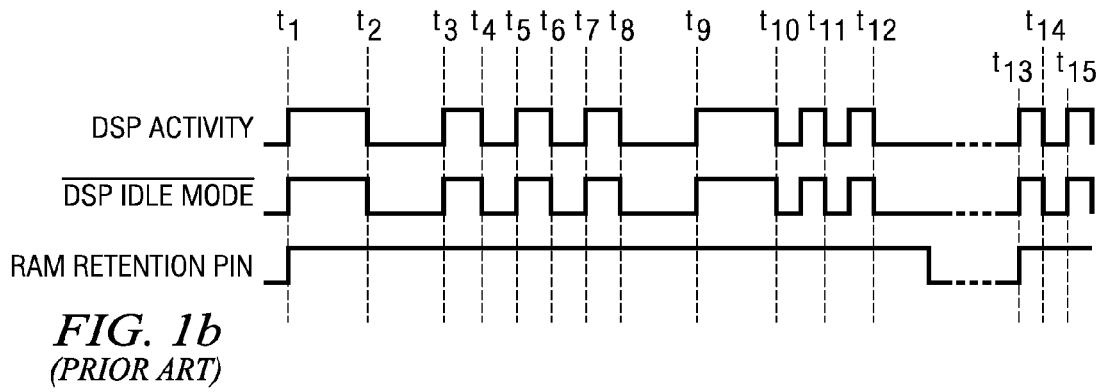

FIG. 1b illustrates a timing diagram showing periods of activity and inactivity, along with a retention control signal to the RAM 12. As shown, the logic 14 waits until the processing core activity has ceased for a sufficient time before placing the RAM 12 in the data retention state (in the illustrated embodiment, the retention state in entered when the RAM data retention node is pulled low).

The method of determining the time to enter data retention mode can be simple or complex. A simple method would enter retention mode after a predetermined time period has expired since the last processing core activity. A more complex method would vary the time from the last processing core activity based on the extent of the preceding activity.

In any case, adapting a processing core 10 of a DSP to make use of a memory with a retention node requires reprogramming the DSP. This can significantly increase the cost of the design.

In the embodiment shown in FIGS. 2a and 2b, a DSP 18 has a processing core 20 is configured to operate the retention node of a memory 22 without any additional code or hardware and with improved energy savings over the prior art. As can be seen in FIG. 2a, processing core 20 is coupled to the RAM 22 in a normal fashion using data and address buses 24. An idle mode node of the processing core 20 is coupled directly to the data retention mode node of memory 22.

Accordingly, as shown in FIG. 2b, the RAM's data retention node is pulled low whenever the active-low signal at the idle mode node ($\overline{DSPidlemode}$) is pulled low. If needed for a given design, an inverter can be placed between the processing core idle mode node and the data retention mode node, such that the RAM 22 is placed in data retention mode when the processing core 20 is in idle mode.

For the TEXAS INSTRUMENTS TMS320C54x family of DSP processors, a task scheduler enables an idle mode when there are no tasks to run. The task scheduler executes one of the several "idle mode" instructions of the C54x. There are three idle modes, activated by the IDLE1, IDLE2, and IDLE3 instructions. In these modes, the TMS320C54x devices enter a dormant state and dissipate considerably less power than in normal operation. The IDLE1 instruction is used to shut down the processing core 10 (i.e., stop clock cycles to the processing core). The IDLE2 instruction is used to shut down the processing core 10 and on-chip peripherals (not shown). The IDLE3 instruction is used to shut down the DSP 18 completely. This instruction stops the PLL circuitry as well as the processing core 20 and peripherals.

Each idle mode instruction generates a two-bit idle mode code to be placed on two nodes in the processing core. For purposes of illustration, the codes are "01" for an IDLE1 instruction, "10" for an IDLE2 instruction and "11" for an IDLE3 instruction. In an embodiment of a decoder 28 shown in FIG. 2c, any or all of the idle mode instructions can cause an active idle mode signal. The two-bit idle mode code selects either a "0" or a "1" to be passed to the RAM data retention pin.

The task scheduler chooses the right idle mode instruction based on the anticipated tasks to do and maximum wake-up time allowed, as shown by the "processing load" signal in FIG. 2c. The processing load signal determines which idle mode(s) will cause $\overline{DSPidlemode}$ to be pulled low (active) and place the memory 22 in data retention mode. For example, if the processing load signal is "11", then any of the three idle modes will cause $\overline{DSPidlemode}$ to be set to "0". If the processing load signal is "10", only the IDLE2 and IDLE3 instructions will set $\overline{DSPidlemode}$ to "0". If the processing load signal is "01", only the IDLE instruction will set $\overline{DSPidlemode}$ to zero.

Since waking up a RAM introduces some small delays prior to accessing the RAM, the decoding logic 28 can be configured to optimizing data retention mode based on processing load. This could be used in a mobile phone application, for example, to set the fastest wakeup mode (processing mode equals "01") while speech communication processing is being performed, while the greatest power saving mode (processing mode equals "11") could be used while the phone is in a paging mode.

This aspect of the invention provides the advantage that the memory can be placed in data retention mode responsive to which of several idle modes is selected. The greatest power savings can be achieved when all idle modes are selected, while a faster response can be achieved by placing the RAM in data retention mode when only the deepest idle mode(s) is selected.

Whenever the task scheduler wakes up the processing core from idle mode, the memory is returned to normal operation.

Thus, as is readily apparent by comparing FIGS. 1b and 2b, using the embodiment of FIG. 2a greatly increases the time in which the RAM 10 is in retention mode. Additionally, the support for retention mode is created without any modification of existing software.

The additional time in idle mode should greatly reduce power leakage by the memory 22, especially in circuits using smaller geometries. In mobile phone applications, such as GSM DRX5 phones, the DSP inactivity approaches 99.9%. Often, the only processing is periodic processing of network information while the phone is in standby. For a GSM phone in standby mode, the DSP awakes every 5 milliseconds to determine if there is a call to be started from the network. If there is, the phone awakes (the phone awakes also if the user is using the keypad or other interfaces). If there is not a call, however, the DSP returns to sleep after is processing is complete, which takes only a small fraction of the 5 millisecond cycle. In such an application, the present invention allows the RAM to enter data retention mode with the DSP, greatly reducing the memory leakage.

The embodiment shown in FIG. 2 allows the RAM 22 to be in data retention mode for almost all of the inactive periods of the processing core 20. Accordingly, the battery life of the mobile phone is greatly increased.

FIG. 3 illustrates a block diagram of a mobile phone 30 using the present invention. Input/output devices 32 (such as a keypad, microphone and speaker) are coupled to the analog baseband circuitry 34. Analog baseband circuitry includes a processing core 20 or other processor having an idle mode output signal node (IM) and a RAM 22 having a data retention input signal node (DR). The idle mode output signal node of processing core 20 is coupled to the data retention input signal node of the RAM 22, and the two devices are coupled by data and address buses 24. The analog baseband circuitry 34 may include other hardware, such as an audio codec. The analog baseband circuitry is coupled to radio frequency (RF) circuitry 36. The input/output devices 32, analog baseband circuitry 34 and RF circuitry 36 are powered by power management circuitry 38.

In operation, the RAM 22 of the analog baseband circuitry 34 is placed in data retention mode each time that the idle mode output signal node is active. Accordingly, the power consumption of the device can be significantly reduced without any code modification in the processing core 20.

While the application has been described in connection with a DSP, it could be used with other types of processors as well. Further, the RAM could be any type of memory, including dynamic random access memory and static random access memory.

Although the Detailed Description of the invention has been directed to certain exemplary embodiments, various modifications of these embodiments, as well as alternative embodiments, will be suggested to those skilled in the art. The invention encompasses any modifications or alternative embodiments that fall within the scope of the Claims.

The invention claimed is:
1. A processing system comprising:
   a processor having an idle mode node for generating an idle mode signal indicating whether the processor is in an idle mode and a plurality of idle mode states in which the idle mode signal indicates which idle mode state is active;

a memory having a data retention node for receiving a data retention mode signal, and circuitry for placing the memory in a low power state responsive to the data retention mode signal, wherein the processor is a processing core of a digital signal processor and an instruction in one of the idle mode states is used to shut down the processing core and an instruction in another of the idle mode states is used to shut down the digital signal processor;

wherein the idle mode signal drives the data retention node; and wherein said processor includes decoding logic for driving said memory into the low power state responsive to selected idle mode states.

2. The processing system of claim 1 wherein the memory is an internal memory of the digital signal processor.

3. The processing system of claim 1 wherein the memory is a static random access memory.

4. The processing system of claim 1 wherein the memory is a dynamic random access memory.

5. The processing system of claim 1 wherein said processor and said memory are further coupled by address and data buses.

6. A mobile communication device comprising:

a processor having an idle mode node for generating an idle mode signal indicating whether the processor is in an idle mode and a plurality of idle mode states in which the idle mode signal indicates which idle mode state is active;

a memory having a data retention node for receiving a data retention mode signal, and circuitry for placing the memory in a low power state responsive to the data retention mode signal, wherein the processor is a processing core of a digital signal processor and an instruction in one of the idle mode states is used to shut down the processing core and an instruction in another of the idle mode states is used to shut down the digital signal processor;

wherein the idle mode signal drives the data retention node, such that the memory is placed in the low power state when the processor is in the idle mode; and wherein said processor includes decoding logic for driving said memory into the low power state responsive to selected idle mode states.

7. The mobile communication device of claim 6 further comprising radio frequency circuitry coupled to said processor and said memory.

8. The mobile communication device of claim 6 further comprising input devices coupled to said processor and said memory.

9. The mobile communication device of claim 6 wherein said memory is an internal memory of the digital signal processor.

10. The mobile communication device of claim 6 wherein the memory is a static random access memory.

11. The mobile communication device of claim 6 wherein the memory is a dynamic random access memory.

12. The mobile communication device of claim 6 wherein said processor and said memory are further coupled by address and data buses.

* * * * *